United States Patent [19]

Ray

[11] 3,976,227

[45] Aug. 24, 1976

[54] LIQUID CHEMICAL DISPENSING UNIT

[75] Inventor: Manuel C. Ray, Rancho Palos Verdes, Calif.

[73] Assignee: ROK Industries, Inc., Long Beach, Calif.

[22] Filed: Jan. 27, 1975

[21] Appl. No.: 544,403

[52] U.S. Cl. .............................. 222/136; 222/145; 222/176; 222/394; 137/575
[51] Int. Cl.² .......................................... B67D 5/60
[58] Field of Search ................. 222/136, 145, 129.1, 222/129.2, 394, 4, 176, 6; 137/260, 209, 263, 575; 211/71, 74; 280/79.3

[56] References Cited
UNITED STATES PATENTS

| | | | |
|---|---|---|---|
| 719,846 | 2/1903 | Neubert .......................... | 222/145 X |
| 2,118,704 | 5/1938 | Grontkowski ................... | 222/176 X |
| 2,812,111 | 11/1957 | Wright et al. .................... | 137/263 X |
| 3,015,419 | 1/1962 | Arnett et al. .................... | 222/145 X |
| 3,409,175 | 11/1968 | Byrne ............................. | 222/129.4 X |
| 3,556,350 | 1/1971 | Hanley ............................. | 222/176 |
| 3,622,046 | 11/1971 | Byrne ............................. | 222/136 |
| 3,880,330 | 4/1975 | Leas et al. ....................... | 222/136 |

FOREIGN PATENTS OR APPLICATIONS 1,571,488 5/1969 France ............................ 280/79.3

Primary Examiner—Robert B. Reeves
Assistant Examiner—Charles A. Marmor
Attorney, Agent, or Firm—Fraser and Bogucki

[57] ABSTRACT

A liquid chemical storage and dispensing unit is disclosed in which a mobile cart supports upper and lower groups of pressure sealable storage tanks containing liquid chemicals. Conduits couple a pressure distributing gas manifold to the upper tanks. Tank pairs comprising one tank each of the upper and lower groups are serially coupled by conduits of equal effective internal dimension extending between an open end within a lower region of the upper tanks and inlet fittings on the lower tanks. An open end in the lower tanks communicates liquid chemical therein via conduits of equal effective internal dimension to a nozzle receiving liquid chemical collecting manifold. A plurality of tank pairs are thereby coupled in parallel between the gas manifold and the liquid chemical collecting manifold providing simultaneous emptying of the tank pairs at an enhanced potential liquid chemical flow rate. In operation, tanks are individually filled with liquid chemical and the cart is transported to a point of use. A gas pressure source coupled to the gas manifold forces liquid chemical through the upper tanks to the lower tanks and from the lower tanks to an outlet coupled to the liquid chemical collecting manifold. Thereafter the pressurized tanks successively feed chemical on demand to coupled sprayers until the last tank is empty.

4 Claims, 4 Drawing Figures

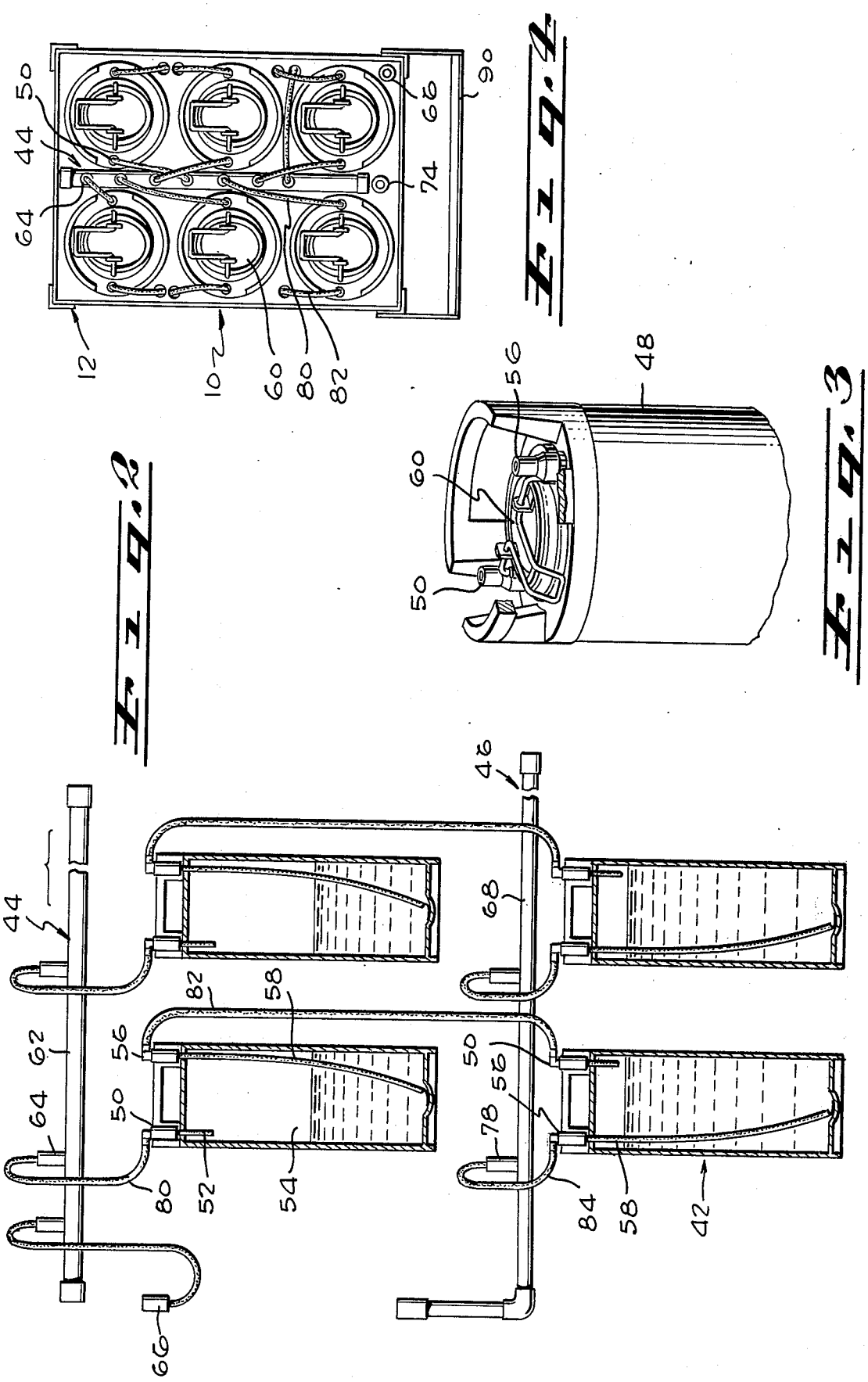

LIQUID CHEMICAL DISPENSING UNIT

BACKGROUND OF THE INVENTION

1. Field of the Invention

This application pertains to liquid chemical transport and dispensing systems. In particular, this invention pertains to apparatus for transporting a substantial quantity of liquid chemical and delivering the chemical at high potential flow rates.

2. Description of the Prior Art

Chemical spraying apparatus in factories finds many applications. Where large quantities of a liquid chemical are to be used at a high rate, transportation of the chemical and subsequent manipulation for use present substantial problems. This situation is apparent in integrated circuit photofabrication. Glass plates having a photographic emulsion are developed to provide master negatives for contact printing on a board having a silicon substrate. The microscopic nature of the circuit image on the glass plate requires exceptional care in handling. Therefore, the plates are processed manually by spraying with suitable photographic development and reversal process chemicals. The susceptibility of the plates to scratches and contamination by dust is such that a single master is only used for about a dozen contact printings. Thus a large number of master plates must be manufactured to meet the demands of the integrated circuit industry, which produces the circuits in extremely high volumes.

In one processing arrangement commonly in use, a 60 gallon drum feeds about 10 hose-coupled nozzles which workers use to spray the plates. The 60 gallon (235 litre) drums commonly used are typically 6 feet (2 meters) high and 3 feet (1 meter) in diameter. The quantity of liquid chemical used is often 15–17 quarts per minute and the dispensing apparatus from the drum must be sufficient to provide this rate of flow.

Although a drum with suitable fittings provides the high flow rate desired in photofabrication, the drum has a number of undesirable aspects. The drums must frequently be changed when usage rates are high, such as 15 quarts of liquid chemical per minute. The drums must be moved from a point of filling to a point of use and the large size causes difficulty in maneuvering. Generally there is an opening at the top of the drum in which a hose may be inserted to add liquid chemical. Drum height makes refilling cumbersome. The bulkiness of the drums invites accidents and injuries to workers.

An extremely tall tank of large volume for providing a high pressure source located adjacent the point of use at a photo-fabrication plant would not be a suitable expedient. Photographic and other chemicals are often unstable or at least subject to change with age or exposure conditions. Large quantities of chemicals are likely to deteriorate or change their properties over the time during which the liquid chemicals in such a tank would be consumed.

Smaller tanks are not suitable for providing a chemical flow with photofabrication since the tanks hold an insufficient quantity of fluid. In the unrelated field of beverage dispensing small tanks have been serially coupled together to increase effective tank storage capacity. However, serial connection limits the potentially available liquid flow rate.

Thus, a convenient chemical dispensing unit which would provide an adequate liquid chemical flow, has a sufficient storage capacity, is easily filled and which would promote worker and factory safety is clearly desirable.

SUMMARY OF THE INVENTION

A liquid chemical support and dispensing unit in accordance with this invention generally comprises a plurality of tanks disposed on a transportable cart. The tanks are coupled in parallel from a gas manifold which pressurizes the tanks to a liquid manifold to dispense a liquid chemical simultaneously from the parallel coupled tanks at a high potential flow rate.

More specifically, the gas manifold is couplable to a pressure line for establishing a gas pressure within a group of gas-impervious liquid chemical storage tanks. Each tank has an inlet coupled to the gas manifold and an internally disposed open end such as a siphon tube coupled to an outlet. The outlet of each tank is coupled to the liquid manifold. Thus, a system is provided which transports a plurality of liquid chemical storage tanks as a unit and in which parallel connected liquid chemical flows deliver sufficient chemical to a liquid manifold to provide a high flow potential.

In a preferred embodiment, the tanks comprise an upper set of storage tanks disposed within an upper portion of the cart, and a lower set of storage tanks disposed within a lower portion of the cart. Individual upper and lower stroage tanks are coupled together serially to provide tank pairs, the tank pairs being coupled in parallel between the gas manifold and the liquid manifold to provide a high potential liquid chemical flow rate.

In particular embodiments, the tanks have a liquid chemical storage capacity on the order of five gallons (18.9 litres) and the tubing coupling the upper and the lower tanks is on the order to one quarter inch (0.4 cm) so that the liquid manifold provides a potential liquid chemical flow rate of at least 15 quarts per minute when pressurized at a level on the order of 20 psi. The tubes used to couple the upper storage tanks to the lower storage tanks are of equal length and the tubes used to couple the lower storage tanks to the liquid manifold are of equal length, to enable the tanks to empty at the same level. Flexible tubing is used in the system for ease of connection and is disposed in arcuate configurations to prevent kinking.

BRIEF DESCRIPTION OF THE DRAWINGS

A better understanding of the invention may be had by reference to the following description in conjunction with the accompanying drawings in which:

FIG. 2 is a diagrammatic representation, also partially broken away, of a portion of the embodiment depicted in FIG. 1;

FIG. 3 is an isometric view of a tank which is utilized in the embodiment of FIG. 1; and FIG. 4 is a top view of the embodiment of FIG. 1.

DETAILED DESCRIPTION

Figure 1:
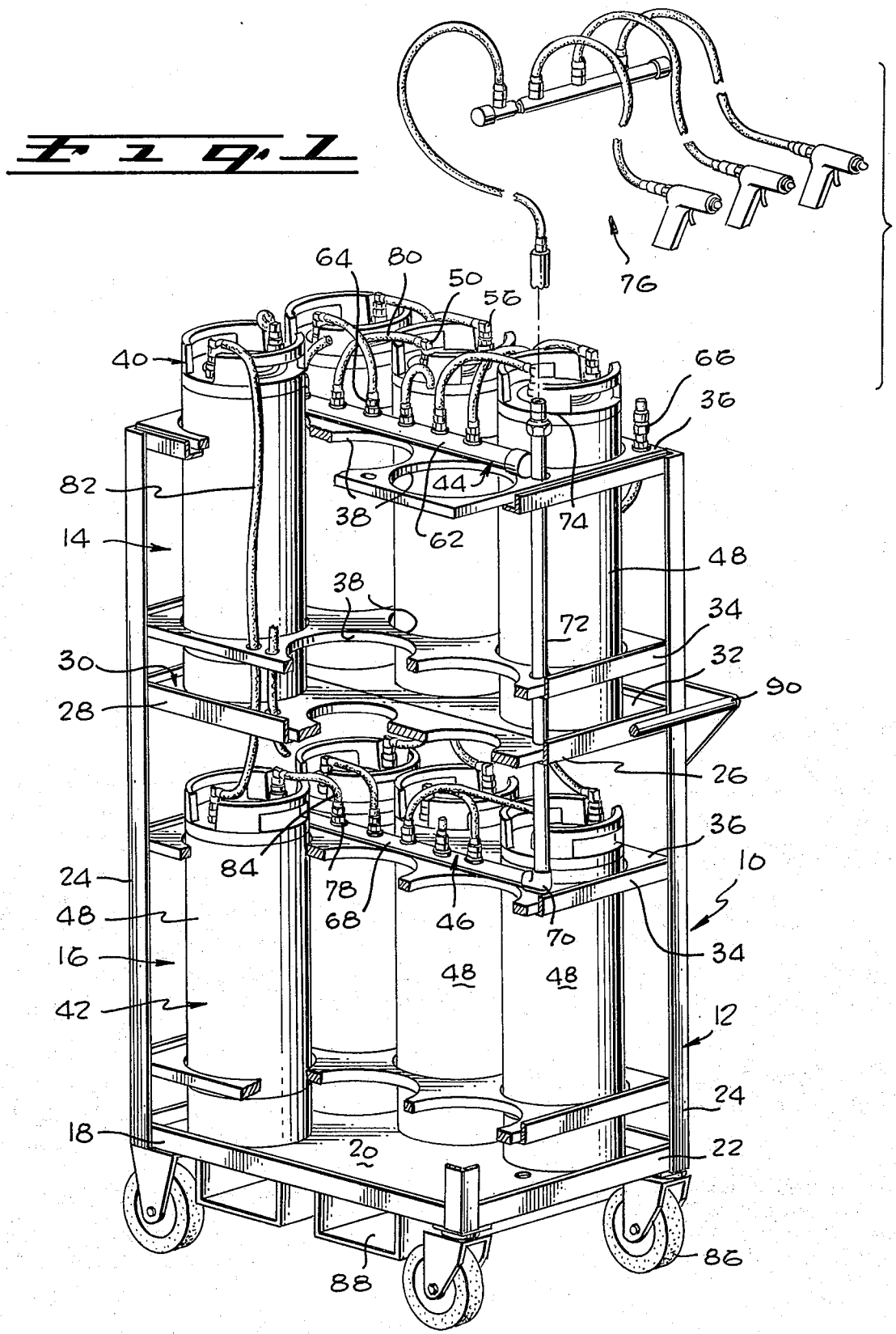
FIG. 1 is a perspective view, partially broken away, of a preferred embodiment of a liquid chemical dispensing unit in accordance with this invention.

With reference to FIGS. 1, 2, 3 and 4, a preferred embodiment of a liquid chemical dispensing system in accordance with this invention comprises a mobile cart 10 for the storage and transport of liquid chemical tanks. The cart has a frame structure 12 defining upper and lower generally rectangular regions 14, 16 above a rectangular base 18 including a rectangular lower tank support bed 20 that is horizontally disposed and has a marginal lip 22 extending upward from each of the four sides.

Four L-shaped riser struts 24, welded at their interior surfaces to the different corners of the base 18, extend vertically at the corners of the frame structure. A first pair of bed support struts 26 are disposed parallel to one another and define a plane normal to the L-shaped riser struts. A second pair of bed support struts 28 are disposed normal to and in the plane of the first pair 26. The first and second pairs of bed support struts are joined to the riser struts 24.

A planar rectangular upper bed 30 has edge portions disposed on the first and second pairs of bed support struts 26, 28, and is located within the upper region 14 of the frame structure 12. The upper bed 30 comprises two rectangular planks 32 disposed adjacent to one another, enabling easy removal and replacement, in the event that service is required.

Upper and lower longitudinal panel supports 34 each comprise a pair of L-shaped struts disposed horizontally in a parallel spaced-apart relationship above the upper bed 30 and the rectangular base 18. Upper and lower apertured rectangular guide panels 36 have a plurality of tank guide openings 38 therein for maintaining a group of tanks upright in a spaced-apart relationship. The panels 36 are horizontally disposed and have edge portions bearing on lateral portions of the upper and lower panel supports 34.

An upper set of cylindrical gas-impervious tanks 40 are disposed on the upper bed 30 and within the openings 38 of the upper panels 36 and a lower set of cylindrical gas-impervious tanks 42 are disposed on the rectangular base 18 and within the openings 38 of the lower panels 36.

In this example, the cart 10 supports twelve tanks, six being disposed along two adjacent rows on the upper bed 30 and six being disposed along two adjacent rows on the rectangular base 18. However, the particular number of tanks is dependent upon the flow and capacity requirements of the particular system. In one other example, (now shown), a single layer of tanks comprises six tanks disposed along two adjacent rows on a single bed. Each tank is directly coupled, via conduction in parallel, between a gas manifold and a liquid manifold.

Each of the individual tanks 48 are of the type which are frequently used in the beverage dispensing industry. These tanks typically have a liquid storage capacity on the order of 5 gallons (19 litres). FIG. 3 depicts an upper portion of one of the tanks 48. Each tank 48 has a one-quarter inch (2.5 cm) tank inlet fitting 50 on the upper portion including a short tube 52 extending partly into a liquid cylindrical support chamber 54. A one-quarter inch (2.5 cm) first tank outlet fitting 56 includes a siphon tube 58 extending substantially into the chamber. The chamber 54 preferably includes a small well or depression at the bottom and the siphon tube 58 includes a cup portion at the open end of the tube 58 extending into the well to allow withdrawal of most of the remaining chemical in the tanks, as is known in the beverage dispensing tank art. It should be noted that an open end which could simply be a coupling communicating with preferably the lowermost portion of the chamber 54 is also suitable. The siphon tube 58 communicates a fluid from the bottom of the chamber 54 to the fitting 56. The one-quarter inch fittings are standard on beverage dispensing tanks, although any selected size correspondingly limits the rate of chemical flow from the tanks. The word fluid is intended to mean either a liquid or a gas. In embodiments in which serially coupled tank pairs are coupled in parallel between the gas manifold 44 and the liquid manifold 46, as will be explained in greater detail below, the siphon tubing 58 will transmit either liquid chemical or pressurized gas depending upon the remaining quantity of liquid chemical in the system. As is best viewed in FIG. 3, the tank 48 is of the type which includes a liquid loading opening within the upper portion of the tank and has a gas-impervious locking unit 60 for sealing the opening following the loading of a liquid chemical into the tank.

The gas manifold 44 comprises a pipe 62 having two closed ends. The pipe 62 is polyvinyl chloride, though stainless steel or other suitable material may be used. In this example, the pipe 62 has an inner diameter of the order of one inch (2.5 cm) and a length of 22 inches (56 cm). A plurality of hose fittings 64 are disposed along the gas manifold 44. The gas manifold 44 further comprises a pressure line fitting 66. Manifold 44 is laterally disposed between the two adjacent rows of tanks above the upper bed 30.

The liquid manifold 46 comprises a pipe 68 having an inner diameter on the order of one inch (2.5 cm) and a length of the order of 22 inches (56 cm), laterally disposed between the two adjacent rows of tanks 42 above the rectangular base 18. The size of the liquid manifold pipe 68 is the same as that of the gas manifold pipe 62 to reduce inventory and parts cost. The liquid manifold should be sufficiently large to provide an adequate flow rate and to allow the tanks to empty at the same time. An elbow pipe element 70 is coupled at one end of the liquid manifold 46. An upright pipe 72 extends vertically from the elbow pipe element 70 which couples the upright pipe 72 to the liquid manifold 46. A manifold or sealing liquid line coupling 74 of the quick disconnect type is disposed at the upper end of the upright pipe 72. The sealing liquid line coupling 74 provides a connection to an external nozzle system or unit 76 to supply a liquid chemical flow at a high potential flow rate when a suitable pressure line is connected to the gas manifold 44. In the preferred embodiment, a pressure source of about 20 psi ($1.4 \times 10^6$ dynes/cm$^2$) provides the satisfactory flow conditions to enable the unit particularly described herein to deliver a flow on the order of 15 to 17 quarts per minute (14 to 16 litres per minute). The liquid manifold 46 also includes a plurality of fittings 78 along the length of the pipe 68.

Pressure communicating first plural conduit or hose elements 80 simultaneously couple the hose fittings 64 of the gas manifold 44 to the inlet fittings 50 of the upper tanks 40. Each of hose elements 80 are of equal effective length and diameter to assure even pressure distribution to the upper tanks 40. The actual length and diameter may be varied while still maintaining equal effective dimensions such as by increasing the actual diameter while increasing the actual length. In this embodiment hose elements 80 have been selected to be 26 inches (66 cm) in length and one-quarter inch (2.5 cm) in diameter.

Upper outlet conductor fluid communicating hose elements 82 couple the second tank outlet fittings 56 of the upper tanks to the inlet fittings 50 of the lower tanks. The hose elements 82 are of equal effective length and diameter to assure that all lower tanks 42 empty at the same rate and at the same time. In this example, hose elements 82 are 14 inches (36 cm) in length and one-quarter inch (2.5 cm) in diameter. The fluid communicating hose elements 82 are coupled to the siphon tubing 58 of the upper tanks 40 for delivering fluid from the lower portion of the upper tanks 40 to the lower tanks 42.

Second plural conduit elements 84 couple the outlet fittings 56 of the lower tanks 40 to the fittings 64 of the liquid manifold 46. Here too, the dimensions of each of the hose elements 84 are the same to assure that all lower tanks empty at equal rates. Elements 84 comprise a 26 inch (66 cm) length of one-quarter inch (2.5 cm) hose.

Thus in this example each upper tank 40 is serially connected with each different lower tank 42 to form a tank pair. The system comprises therefore a plurality of tank pairs coupled in parallel between the gas manifold 44 and the liquid manifold 46.

To achieve an adequate flow such as 15 to 17 quarts per minute (14 to 16 litres per minute), it is necessary to utilize couplings and tubings of sufficient diameter. However, the standard one-quarter inch fittings supplied with many tanks limit the effectiveness of increased diameter conduit. The mere increase of pressure applied to the gas manifold 44 is, as a practical matter, insufficient to adequately increase flow to desired dispensing levels. Thus, to enhance the system flow rate in accordance with this invention, the tank pairs are connected in parallel.

Casters 86 are disposed beneath the base 18 to provide the cart with mobility. A pair of metal channel members 88 defining fork lift sleeves of rectangular cross section are disposed in a spaced-apart relationship longitudinally parallel to one another. The channel members 88 are welded longitudinally along the underside of the base 18. A pair of planar elements are disposed parallel to one another and are joined to adjacent riser struts 24. The planar elements support a longitudinal member to provide a handle 90 for manual movement of the cart 10.

In operation, the individual tanks 40 are first filled with liquid chemical. By lifting upward on a handle, the gas-tight locking unit 60 may be partially lowered into the liquid support chamber 54 exposing an opening by which the tank may be filled. A worker then inserts a hose into the chamber 54 and fills each of the tanks. The lower tanks 42 are filled first to prevent any siphon action from occurring between the upper tanks 40 and the lower tanks 42. If siphon action occurs, the worker will not be able to accurately determine the amount of liquid which has been loaded into each of the tanks.

After the tanks are loaded, the gas-tight locking unit 60 seals the opening of the tank. The gas manifold 44 may then be coupled to a pressure source to provide an initial pressurization of the system. The system is pressurized with a gas which is relatively inert with respect to the particular liquid chemical used. For example, with photohraphic development chemicals, nitrogen is usually suitable. The initial pressurization enables the detection of possible leaks in the system. It is desirable, particularly with chemicals highly susceptible to deterioration from oxidation, that the relatively inert gas escape from the system in the event of a leak rather than have oxygen from the atmosphere enter the system. Pressurization assures that gas will be directed externally.

The dispensing unit described herein is suitable for filling with liquid chemical at a manufacturing plant and is particularly beneficial where chemicals are provided by a supplier remote from the point of use or the plant facility. The cart 10 may be moved to its point of use by a fork lift truck utilizing the sleeves of the metal channel member 88. The cart 10 may also be moved or wheeled manually on the casters 86 using the handle 90.

A pressure source is supplied to the gas manifold 44 by coupling a gas tank to the pressure line fitting 66. Gas pressure is distributed to conduit fittings 64 in the gas manifold 44 and to the upper tanks 40. The external nozzle unit 76 is coupled to the sealing liquid line coupling 74. Pressure in each of the upper tanks 40 creates a greater pressure in the upper portion of the upper tanks than the lower portion, thereby forcing the liquid chemical in the lower portion of the upper tanks to exit by the siphon tube 58 and the tubing 82 to force the liquid chemical into the lower tanks 42. The excess fluid in the lower tanks 42, whether it be the liquid chemical or gas, provides excess pressure in the upper portion of the tanks 42 forcing liquid up the siphon tubing 58 of the lower tanks 42 through the conduit elements 84 and into the liquid manifold 46. Liquid chemical in the manifold 46 is forced through the upright pipe 72 and the sealing liquid line coupling 74 to the nozzle unit 76. The pressure which is typically applied to the unit depicted in FIG. 1 is on the order of 20 psi ($1.4 \times 10^6$ dynes/cm$^2$). Rather large variations in pressure in excess of 20 psi do not substantially affect the flow at coupling 76.

After both the upper and lower tanks have been depleted, the cart 10 is removed for refilling. Thus convenience and mobility reduce the dangers which are inherent with large drum tanks. Yet the liquid chemical dispensing unit has a 60 gallon capacity and supplies liquid chemical at a high potential flow rate.

While the invention has been particularly shown and described with reference to a preferred embodiment thereof, it will be understood by those skilled in the art that various changes in form and details may be made therein without departing from the spirit and scope of the invention.

What is claimed is:
1. Apparatus for storing and dispensing a liquid chemical at a uniform spray rate comprising:
 a cart having a frame structure comprising a rectangular base, the base including a rectangular lower tank support bed horizontally disposed and having a marginal lip extending upward from the bed;
 four vertically extending L-shaped riser struts, each joined to a different corner of the base;
 a first pair of bed support struts, the struts of the first pair being disposed parallel to one another, and the first pair defining a plane normal to the L-shaped riser struts, and a second pair of bed support struts disposed normal to and in the plane of the first pair of bed support struts, the first and second pairs of bed support struts being joined to the riser struts;
 a planar rectangular upper bed for supporting a plurality of tanks, the bed having edge portions disposed on the first and second pairs of bed support struts;
 upper and lower longitudinal panel supports disposed horizontally in a parallel spaced-apart relationship above the upper and lower beds, respectively;

upper and lower apertured rectangular guide panels having a plurality of tank guiding openings therein for maintaining a plurality of tanks in a spaced-apart relationship and in an upright position, the panels being positioned horizontally and having edge portions disposed on the upper and lower panel supports;

an upper set of cylindrical tanks disposed upright on the upper bed and within the openings of the upper panel, and a lower set of cylindrical tanks disposed upright on the lower tank support bed and within the openings of the lower panel, each of the upper and lower tanks being of the type having a cylindrical liquid support chamber, an upper portion, a gas-impervious inlet fitting on the upper portion including a short tube extending partly into the chamber, an outlet fitting including a siphon tube extending substantially into the chamber for communicating a fluid from the bottom of the chamber to the fitting, a liquid loading opening within the upper portion of the tank, and a gas-tight locking unit for sealing the opening following the loading of a liquid chemical into the tank;

a gas manifold comprising a pipe having two closed ends, a plurality of hose fittings and a pressure receiving fitting;

a liquid manifold comprising a pipe having a closed end and a plurality of hose fittings along the length thereof and a liquid outlet fitting opposite the closed end;

a plurality of pressure communicating hose elements coupling the hose fittings of the gas manifold to the inlet fittings of the upper tanks;

a plurality of fluid communicating hose elements coupling the outlet fittings of the upper tanks to the inlet fittings of the lower tanks; and a plurality of liquid communicating hose elements coupling the outlet fittings of the lower tanks to the inlet fittings of the liquid manifold;

the fluid dispensing system thereby providing a plurality of serially connected upper and lower tank pairs, the pairs being connected in parallel between the liquid and gas manifolds to provide a simultaneously depletable liquid chemical at an outlet of the manifold at a high available flow rate.

2. The invention as set forth in claim 1 and wherein:
the system is arranged to provide a potential liquid chemical flow of at least 15 quarts per minute;
the intake gas manifold is couplable to a pressure source of the order of 20 pounds per square inch;
each cylindrical chamber has a capacity of the order of 20 quarts; and
the cart supports twelve tanks, six of which are disposed along two adjacent rows on the upper tank support bed and six of which are disposed along two adjacent rows on the lower tank support bed.

3. The invention as set forth in claim 2 and wherein:
the gas manifold pipe has a diameter on the order of 1 inch, a length of 22 inches and is laterally disposed between the two adjacent rows of tanks above the upper tank support bed;
the liquid manifold pipe has a diameter on the order of 1 inch, a length of 22 inches and is laterally disposed between the two adjacent rows above the lower tank support bed;
the liquid manifold further comprises an elbow pipe element and an upright pipe having an inner diameter not substantially less than about 0.5 inch, the elbow pipe element coupling the upright pipe to the laterally disposed liquid manifold pipe; and
the upright pipe comprises an upper end portion and a sealing liquid line coupling attached to the upper portion, the upright pipe being clamped to the cart.

4. The invention as set forth in claim 1 and in which the cart comprises:
four spaced-apart casters coupled to the frame beneath the lower tank support bed;
a pair of metal channel members defining fork lift sleeves of rectangular cross section, the rectangular base of the frame having an underside and longitudinal axis and the channel members being joined longitudinally along the underside of the base; and
a handle coupled to the frame for manual movement of the cart.

* * * * *